United States Patent [19]

Etzbach et al.

[11] Patent Number: 5,401,612
[45] Date of Patent: Mar. 28, 1995

[54] POLYESTERS CONTAINING NONLINEAR-OPTICAL CHROMOPHORES, AND THE USE THEREOF

[75] Inventors: Karl-Heinz Etzbach, Frankenthal; Ruediger Sens; Stefan Beckmann, both of Mannheim, all of Germany

[73] Assignee: BASF Aktiengesellschaft, Ludwigshafen, Germany

[21] Appl. No.: 245,549

[22] Filed: May 18, 1994

[30] Foreign Application Priority Data

May 21, 1993 [DE] Germany .................. 43 17 094.3

[51] Int. Cl.$^6$ ............................................. G03C 1/725
[52] U.S. Cl. .................................. 430/285; 528/272; 528/288; 528/289; 528/290; 528/291; 528/298; 430/59; 430/286; 430/322
[58] Field of Search ............... 528/272, 288, 289, 290, 528/291, 298; 430/285, 59, 286, 322

[56] References Cited

U.S. PATENT DOCUMENTS 4,757,130  7/1988  DeMartino ..................... 528/288

FOREIGN PATENT DOCUMENTS 2657083  7/1991  France .

OTHER PUBLICATIONS

Chen et al., *Macromolecules*, vol. 24, 1991, pp. 5421–5428.

*Primary Examiner*—Samuel A. Acquah
*Attorney, Agent, or Firm*—Keil & Weinkauf

[57] ABSTRACT

Polyesters containing nonlinear-optical chromophores, which have mean molecular weights $M_w$ of from 5000 to 500,000 and contain units of the formula (I)

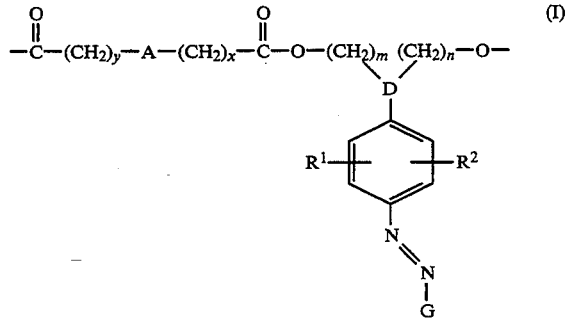

where
- A is a divalent radical,
- D is an electron donor,
- G is a heterocyclic ring as electron acceptor,
- x and y are identical or different numbers,
- m and n are identical or different numbers, and
- $R^1$ and $R^2$ are identical or different radicals, are suitable, for example, as components in communications technology.

4 Claims, No Drawings

POLYESTERS CONTAINING NONLINEAR-OPTICAL CHROMOPHORES, AND THE USE THEREOF

The present invention relates to polyesters containing nonlinear-optical chromophores, in particular those which contain azo dyes with heterocyclic components. As a consequence of their nonlinear-optical properties, these polyesters are suitable for components in communications technology.

Polyester-based polymers containing nonlinear-optical chromophores which contain nitroazo dyes and stilbenes have already been disclosed and are described, for example, in U.S. Pat. No. 4,757,130, FR-A-26576083 and by M. Chen and L. Yu in Macromolecules 24 (1991), 5421.

However, it has been found that such polyesters have deficiencies when used in nonlinear-optical systems.

It is an object of the present invention to provide novel polyesters which contain azo dyes as chromophores in the side chain and are advantageously suitable for use in nonlinear-optical systems.

Azo dyes with heterocyclic components per se are known and are used in many areas, for example in textile coloring.

However, their incorporation into polyesters produced a surprising effect on the nonlinear-optical properties of such systems.

We have found that this object is achieved by polyesters containing nonlinear-optical chromophores, which have mean molecular weights $\overline{M}_w$ of from 5000 to 500,000 and contain units of the formula (I)

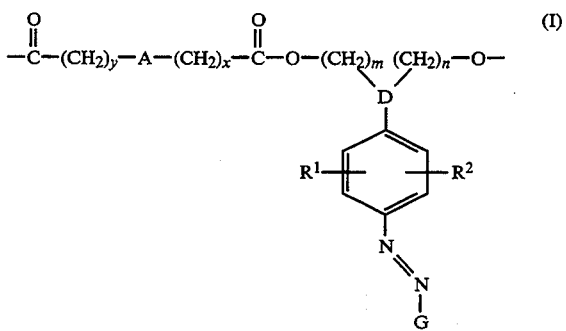

in which
- A is phenylene, phenylene which is substituted by 1 to 4 $C_1$- to $C_6$-alkyl or $C_1$- to $C_6$-alkoxy groups, naphthylene, cycloalkylene having 3 to 8 carbon atoms, alkylene having 1 to 10 carbon atoms or a single bond,
- D is an electron donor,
- G is a heterocyclic ring as electron acceptor,
- x and y are identical or different numbers from 0 to 10,
- m and n are identical or different number from 1 to 10,
- $R^1$ and $R^2$ are identical or different and are hydrogen, alkyl having 1 to 6 carbon atoms, alkoxy having 1 to 6 carbon atoms, alkyl which is substituted by phenyl or $C_1$- to $C_4$-alkoxy, CN, $NO_2$, $SO_3H$, CHO or a cross-linkable group.

The heterocyclic ring as electron acceptor G is, in particular, a radical of the formulae

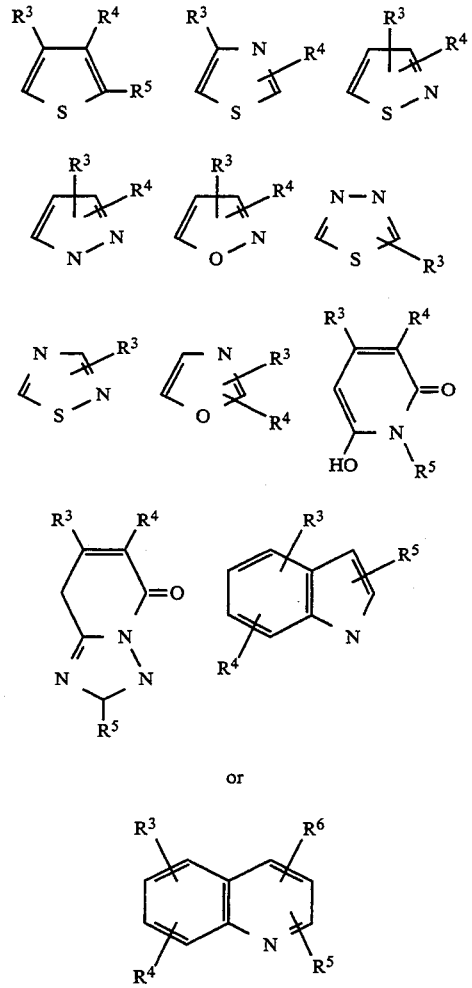

or in which
- $R^3$ to $R^6$ are identical or different and are alkyl having 1 to 10 carbon atoms, cycloalkyl having 3 to 8 carbon atoms, alkoxy having 1 to 8 carbon atoms, halogen, CN, $NO_2$, $CONH_2$, $CONR_2^7$, $COOR^7$, or $(CH_2)_z$-$COOR^7$, where
- $R^7$ is alkyl having 1 to 10 carbon atoms and z is 1 to 10, or are alkenyl having 2 to 10 carbon atoms, or in each case two of the radicals $R^3$ to $R^6$ form fused rings with one another.

The electron donor D in the formula (I) is preferably $NR^8$, where $R^8$ is $C_1$- to $C_6$-alkyl, $C_2$- to $C_6$-alkenyl, $C_5$- to $C_7$-cycloalkyl, phenyl, tolyl, benzyl or a crosslinkable group.

Examples of crosslinkable groups in the polyesters according to the invention are, in particular, cinnamyl, oxiranyl, acrylate, methacrylate, vinyl, vinyl ester, vinyl ether, CN, $NO_2$, $SO_3H$ and CHO radicals.

The present invention also provides the use of the novel polyesters in nonlinear optics and in components for communications technology.

The novel polyesters containing nonlinear-optical chromophores containing heterocyclic rings allows significant improvements to be made.

Firstly, the resultant polymers have good nonlinear-optical values, and secondly, good layer formation with low optical losses during light conduction is possible.

In particular, the suitability of the polyesters in communications technology, in optical modulators (for example Mach-Zehnder interferometer), in optical switches, in frequency mixing or in optical waveguides should be emphasized.

The following details apply to the structure of the novel polyesters and their use.

Both the preparation of the novel polyesters and that of the parent chromophores can be carried out by conventional and known methods of organic chemistry, as described, for example, in March, Advanced Organic Chemistry, or Organicum, 16th Edition.

The monomeric azo dyes having heterocyclic components to be employed as starting materials for the polyesters can be prepared, for example, by reacting appropriately substituted, amino-carrying heterocyclic compounds with nitrosylsulfuric acid in a strongly acidic medium. The resultant diazonium salt solutions can then be reacted with N,N-bis(hydroxyalkyl)aniline in a strongly acidic medium (conc. sulfuric acid + amidosulfuric acid) (if possible at <5° C.), isolated by addition of alkali metal hydroxide solution and purified in a conventional manner (for example by recrystallization). Resultant bishydroxyl compounds can then be converted into the novel pollyesters, for example by reaction with approximately equimolar amounts of terephthaloyl dichloride, and purified in a conventional manner (for example by reprecipitation).

The novel polyesters having nonlinear-optical properties generally have mean molecular weights $\overline{M}_w$ of from 5000 to 500,000, preferably from 10,000 to 100,000.

They contain or comprise units of the formula (I)

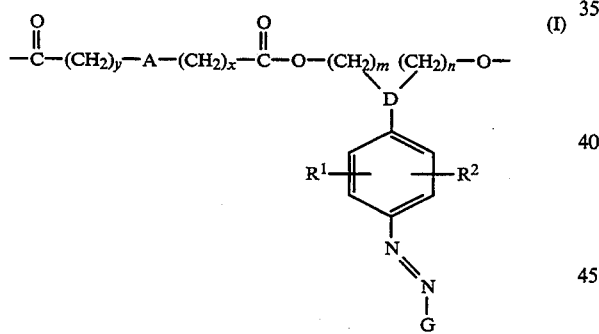

where

A is phenylene, phenylene which is substituted by 1 to 4 $C_1$- to $C_6$-alkyl, for example methyl, ethyl, propyl, isopropyl, n-butyl, isobutyl, tert -butyl, hexyl, octyl or 2 -ethylhexyl, or $C_1$- to $C_6$-alkoxy, for example methoxy, ethoxy, propoxy or butoxy, or is naphthylene, cycloalkylene having 3 to 8 carbon atoms, for example cyclohexyl, alkylene having 2 to 10 carbon atoms or a single bond, D is an electron donor, in particular $NR^8$, where $R^8$ is $C_1$- to $C_6$-alkyl, for example methyl, ethyl, propyl, isopropyl, butyl or hexyl, $C_2$- to $C_6$-alkenyl, for example vinyl or allyl, $C_5$- to $C_7$-cycloalkyl, for example cyclopentyl, cyclohexyl or cycloheptyl, phenyl, tolyl, benzyl or a crosslinkable group, such as a cinnamyl, oxiranyl, acrylate, methacrylate, vinyl, vinyl ester, vinyl ether, CN, $NO_2$, $SO_3H$ or CHO radical, G is a heterocyclic ring as electron acceptor, in particular a radical of the formula

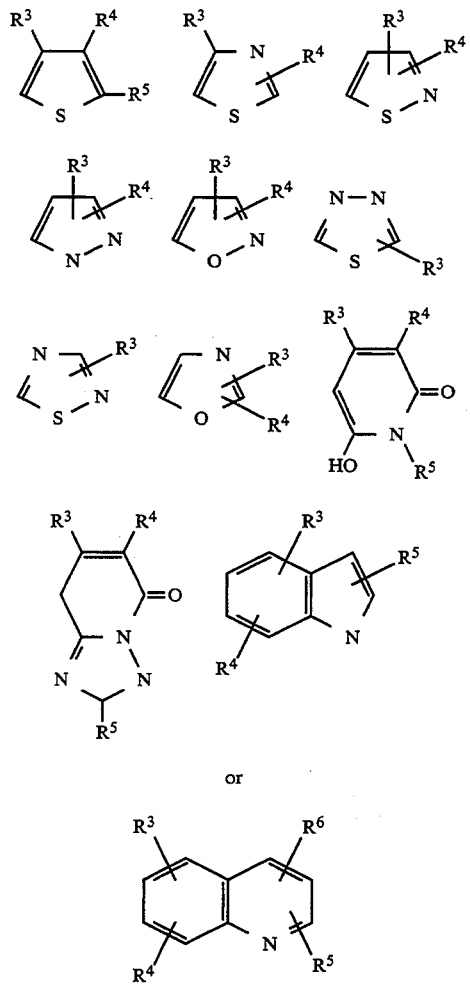

or where $R^3$ to $R^6$ are identical or different and are alkyl having 1 to 10 carbon atoms, for example methyl, ethyl, n-propyl, isopropyl, n-butyl, isobutyl, hexyl, heptyl, octyl or decyl, cycloalkyl having 3 to 8 carbon atoms, for example methyl, ethyl, butyl, hexyl or octyl, alkoxy having 1 to 8 carbon atoms, for example methoxy, ethoxy, propoxy or butoxy, halogen, for example fluorine, chlorine, bromine or iodine, CN, $NO_2$, $COOR^7$, $(CH_2)_z$-$COOR^7$, where $R^7$ is alkyl having 1 to 10 carbon atoms and z is 1 to 10, or alkenyl having 2 to 10 carbon atoms, for example vinyl or allyl, or in each case two of the radicals $R^3$ to $R^6$ form fused rings, for example naphthyl, with one another, x and y are identical or different numbers from 0 to 10, preferably from 0 to 4, and m and n are identical or different numbers from 1 to 10, preferably from 2 to 5, and $R^1$ and $R^2$ are identical or different and are hydrogen, alkyl having 1 to 6 carbon atoms, for example methyl, ethyl, n-propyl, isopropyl, n-butyl, isobutyl, pentyl or hexyl, alkoxy having 1 to 6 carbon atoms, for example methoxy, ethoxy, propoxy or butoxy, alkyl which is substituted by phenyl or $C_1$- to $C_4$-alkoxy, for example methylmethoxy, CN, $NO_2$, $SO_3H$, CHO or a crosslinkable group of the type mentioned above under $R^8$.

Examples of preferred chromophores containing heterocyclic rings are:

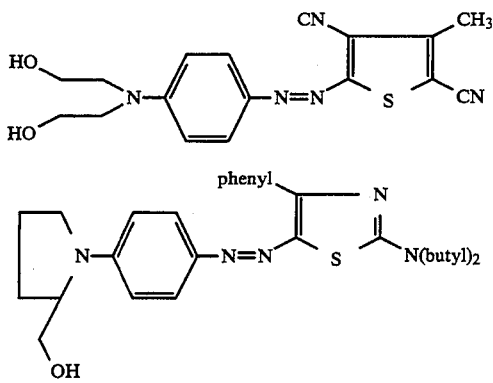

Coatings containing the novel polyesters are produced in a manner known per se, for example by wet coating (spin coating) using a 5–15% strength solution of the polyester in a solvent (for example tetrachloroethane, methylene chloride or tetrahydrofuran).

Examples of suitable substrates include indium-tin oxide (ITO). Given a suitable substitution pattern (for example epoxy structure), the polymers can also be crosslinked photochemically, thermally or by the action of electron beams.

The novel polyesters are distinguished by good convertibility into thin coatings, high purity, narrow molecular-weight distribution, good alignment in an electric field, good long-term stability and good electro-optical coefficients.

In the examples, parts and percentages are by weight, unless stated otherwise.

I. Preparation of Monomeric Azo Dyes with Heterocyclic Components

EXAMPLE 1

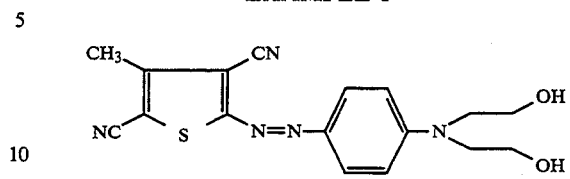

1.63 g (0.01 mol) of 2-amino-3,5-dicyano-4-methylthiophene were stirred in 50 g of glacial acetic acid/propionic acid (17:3 v/v). 7 g of 85% strength by weight sulfuric acid were subsequently added dropwise at room temperature and 3 g of nitrosylsulfuric acid were added dropwise at from 0° to +5° C.

After the mixture had been stirred at from 0° to 5° C. for three hours, the resultant diazonium salt solution was added dropwise to 2.09 g (0.01 mol) of N,N-bis(hydroxyethyl)aniline in 150 g of ice-water and 10 g of conc. sulfuric acid and 0.5 g of amidosulfuric acid at <0.5° C. at a pH of from 1 to 1.5. The pH was held at from 1 to 1.5 by addition of 20% strength by weight sodium hydroxide solution. After the mixture had been left overnight and stirred at room temperature, the precipitated dye was filtered off with suction, washed with water, dried and recrystallized from chlorobenzene.

Yield: 2.2 g $C_{17}H_{17}N_4O_2S$ (341) Calc.: C 59.82 H 5.00 N 16.42 O 9.38 S 9.38 Found: C 60.10 H 4.95 N 16.30 O 8.99 S 9.66

The products listed in the table below can be obtained by methods similar to that of Example 1.

| Ex. No. | Formula |
|---|---|
| 2 | ![structure with Cl, CN, NC, S, N=N, phenyl, N(CH2CH2OH)2] |
| 3 | ![structure with Cl, CN, OHC, S, N=N, phenyl, N(CH2CH2OH)2] |
| 4 | ![structure with N-N, Phenyl, S, N=N, phenyl, N(CH2CH2OH)2] |
| 5 | ![structure with H3C, CN, NC, S, N=N, phenyl, N(CH2CH2CH2OH)(CH2OH)] |

-continued

| Ex. No. | Formula |
|---|---|
| 6 | 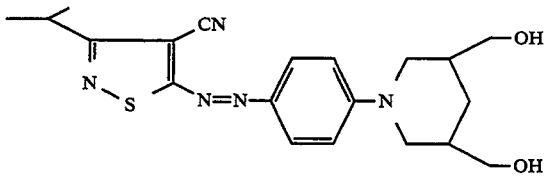 |
| 7 | 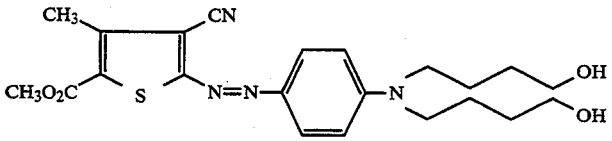 |
| 8 | 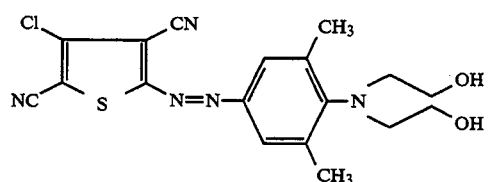 |
| 9 | 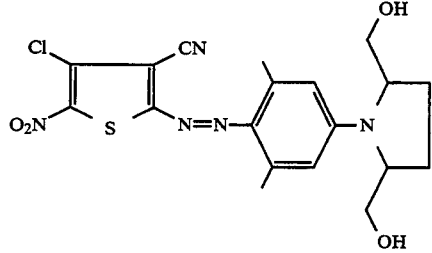 |
| 10 | 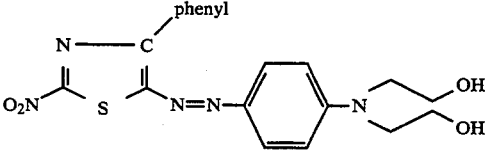 |

II. Preparation of the Novel Polyesters

EXAMPLE 11

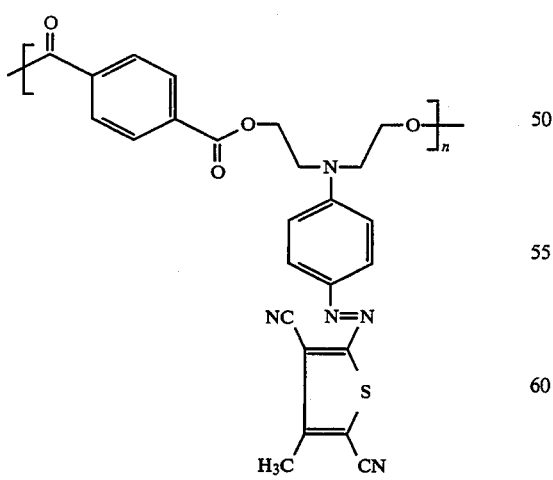

2.02 g (0.01 mol) of terephthaloyl chloride and 3.41 g (0.01 mol) of the azo dye as in Example 1 were refluxed for 5 hours in 100 g of dry toluene. The polymer was precipitated by means of methanol and re-precipitated a number of times from hexane/methanol. After the solvent had been removed, the polyester was dried in a high vacuum. Quantitative determination of the polyester was carried out by elemental analysis. The molecular weight was determined by gel permeation chromatography. The glass transition temperature of the polymer was determined by differential calorimetry.

$\overline{M}_w = 34,000$ (mean molecular weight)

$T_g = 105$ (glass transition temperature)

Examples 12 to 17 for novel polyesters are shown in Table 2.

| Ex. No. | Formula | $\overline{M}_w$ | $T_g$ |
|---|---|---|---|
| 12 | 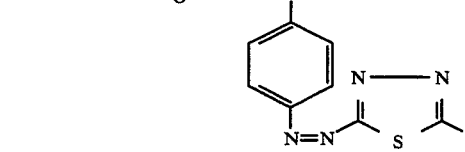 | 11000 | 85 |
| 13 |  | 13000 | 103 |
| 14 | 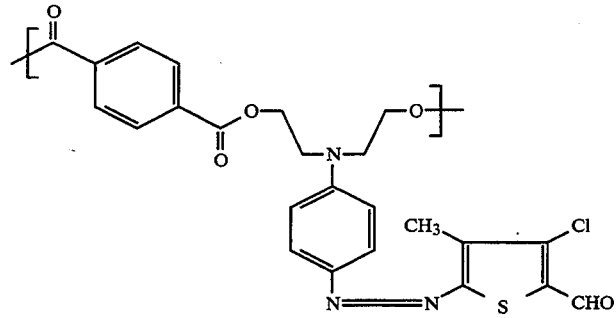 | 14000 | 98 |
| 15 | 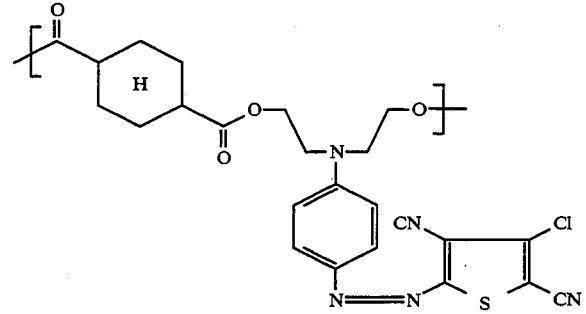 | 23000 | 85 |
| 16 | 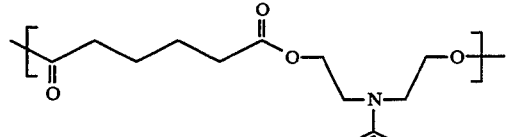 | 14000 | 75 |

| Ex. No. | Formula | $\overline{M}_w$ | $T_g$ |
|---|---|---|---|
| 17 | 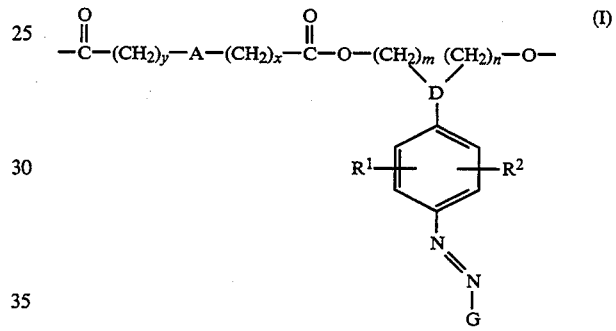 | 20000 | 96 |

III. Coating Formation and Polarization in an Electric Field; Determination of the Electro-Optical Coefficient

EXAMPLE 18

2 g of the polyester from Example 11 were dissolved in 30 g of N-methylpyrrolidone and converted into a coating with a thickness of 50 μm by spin coating. The sample was subsequently placed between two transparent glass electrodes with an electroconductive, transparent indium-tin oxide coating (ITO coating). A 100 V/mm electric field was applied to the sample at 100° C. and held for 15 minutes. The sample is allowed to cool to room temperature, and the electric polarization field was removed.

The electro-optical coefficient of the polarized polyester sample was subsequently determined at a laser wavelength of 1306 nm at r=19 pm/V.

(The formulae for determining the electro-optical coefficient can be obtained from the literature, for example D. A. Williams, Angew. Chem. 96 (1984), 637.)

Other examples of electro-optical coefficients of the novel polyesters are:

| Ex. No. | r [pm/V] |
|---|---|
| 12 | 14 |
| 15 | 16 |

We claim:

1. A polyester containing nonlinear-optical chromophores, which has a mean molecular weight $\overline{M}_w$ of from 5000 to 500,000 and contains units of the formula (I)

$$-\overset{O}{\overset{\|}{C}}-(CH_2)_y-A-(CH_2)_x-\overset{O}{\overset{\|}{C}}-O-(CH_2)_m\underset{D}{(CH_2)_n}-O- \quad (I)$$

with $R^1$ and $R^2$ on a phenyl ring bonded to D, and N=N-G in which

A is phenylene, phenylene which is substituted by 1 to 4 $C_1$- to $C_6$-alkyl or $C_1$- to $C_6$-alkoxy groups, naphthylene, cycloalkylene having 3 to 8 carbon atoms, alkylene having 1 to 10 carbon atoms or a single bond, D is an electron donor, G is a heterocyclic ring as electron acceptor, x and y are identical or different numbers from 0 to 10, m and n are identical or different numbers from 1 to 10, $R^1$ and $R^2$ are identical or different and are hydrogen, alkyl having 1 to 6 carbon atoms, alkoxy having 1 to 6 carbon atoms, alkyl which is substituted by phenyl or $C_1$- to $C_4$-alkoxy, CN, $NO_2$, $SO_3H$, CHO or a cross-linkable group.

2. A polyester as claimed in claim 1, wherein G is a radical of this formula

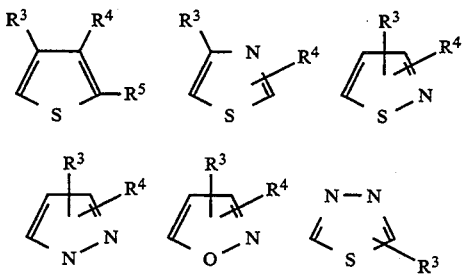

-continued

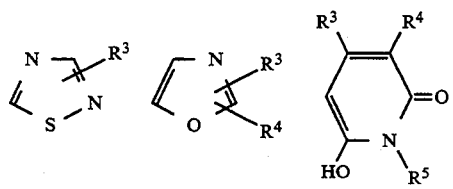

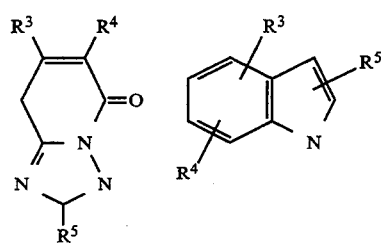

or

-continued

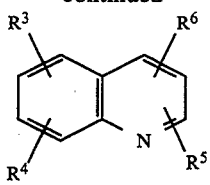

in which

R$^3$ to R$^6$ are identical or different and are alkyl having 1 to 10 carbon atoms, cycloalkyl having 3 to 8 carbon atoms, alkoxy having 1 to 8 carbon atoms, halogen, CN, NO$_2$, CONH$_2$, CONR$_2^7$, COOR$^7$, or (CH$_2$)$_z$-COOR$^7$, where R$^7$ is alkyl having 1 to 10 carbon atoms and z is 1 to 10, or are alkenyl having 2 to 10 carbon atoms, or in each case two of the radicals R$^3$ to R$^6$ form fused rings with one another.

3. A polyester as claimed in claim 1, wherein D in the formula (I) is NR$^8$, where R$^8$ is C$_1$- to C$_6$-alkyl, C$_2$- to C$_6$-alkenyl, C$_5$- to C$_7$-cycloalkyl, phenyl, tolyl, benzyl or a crosslinkable group.

4. A polyester as claimed in claim 1, wherein the crosslinkable group is cinnamyl, oxiranyl, acrylate, methacrylate, vinyl, vinyl ester, vinyl ether, CN, NO$_2$, SO$_3$H or CHO.

* * * * *